United States Patent
Azuma

(10) Patent No.: US 7,731,590 B2
(45) Date of Patent: Jun. 8, 2010

(54) CREATION OF RANKING TABLE FOR COMPETITIVE GAME

(75) Inventor: Shin Azuma, Kobe (JP)

(73) Assignees: Kabushiki Kaisha Square Enix, Tokyo (JP); Nintendo Co., Ltd., Kyoto (JP)

( * ) Notice: Subject to any disclaimer, the term of this patent is extended or adjusted under 35 U.S.C. 154(b) by 343 days.

(21) Appl. No.: 11/624,555

(22) Filed: Jan. 18, 2007

(65) Prior Publication Data

US 2007/0191105 A1  Aug. 16, 2007

(30) Foreign Application Priority Data

Jan. 19, 2006  (JP) ............................ 2006-011545

(51) Int. Cl.
  *A63F 9/24* (2006.01)
  *A63F 13/00* (2006.01)
  *G06F 19/00* (2006.01)
  *A63F 13/12* (2006.01)

(52) U.S. Cl. ................ 463/42; 463/1; 463/43; 273/108.1; 273/317.1; 273/461; 709/207; 709/216

(58) Field of Classification Search ............. 463/1, 463/9–13, 16, 20, 25, 29, 40–43; 273/108.1, 273/145 R, 147, 141 A, 317.1, 351, 454–456, 273/460–461; 705/14, 26, 35, 36 R, 37, 705/42, 77; 902/10, 23; 709/203–207, 216–219, 709/225, FOR. 106, FOR. 111, FOR. 112, 709/FOR. 115, FOR. 122, FOR. 130, FOR. 131, 709/FOR. 132, FOR. 141, FOR. 148, FOR. 149, 709/FOR. 153; 340/7.1, 7.2, 7.21, 7.28, 340/311.1, 311.2, 426.21, 572, 825.29, 825.44; 715/706, 738, 744, 757–758, 762–764; 704/E15.047
See application file for complete search history.

(56) References Cited

U.S. PATENT DOCUMENTS 5,695,400 A  12/1997  Fennell, Jr. et al.

(Continued)

FOREIGN PATENT DOCUMENTS

JP  11-319319  11/1999

(Continued)

OTHER PUBLICATIONS http://games.yahoo.com, Chess, inter alia, Dec. 5, 1998, Yahoo!, see entire disclosure,.*

(Continued)

*Primary Examiner*—Peter DungBa Vo
*Assistant Examiner*—Arthur O. Hall
(74) *Attorney, Agent, or Firm*—Greenblum & Bernstein, P.L.C.

(57) ABSTRACT

Game apparatuses connected in a peer-to-peer manner play a competitive game with each other. Each of the game apparatuses stores a ranking table ranking points of multiple users based on past games of the users. When finishing playing the game, the game apparatuses respectively calculate points obtained by the respective users based on the result of the game, and update the ranking tables based on the newly calculated points. The game apparatuses transmit and receive information on the updated ranking table to and from each other. Each game apparatus integrates the ranking table locally stored with the ranking table transmitted from the other game apparatus to generate a new ranking table, and displays the new ranking table on a display device.

22 Claims, 7 Drawing Sheets

U.S. PATENT DOCUMENTS

| | | | |
|---|---|---|---|
| 6,213,873 B1 * | 4/2001 | Gasper et al. | 463/14 |
| 6,839,435 B1 * | 1/2005 | Iijima et al. | 380/251 |
| 6,887,159 B2 * | 5/2005 | Leen et al. | 463/42 |
| 7,192,352 B2 * | 3/2007 | Walker et al. | 463/42 |
| 7,600,251 B2 * | 10/2009 | Gatto et al. | 726/1 |
| 2001/0039211 A1 | 11/2001 | Yoshizawa | |
| 2002/0016205 A1 * | 2/2002 | Nagata et al. | 463/40 |
| 2002/0155884 A1 * | 10/2002 | Updike | 463/25 |
| 2003/0190960 A1 * | 10/2003 | Jokipii et al. | 463/42 |
| 2003/0204566 A1 * | 10/2003 | Dhupelia et al. | 709/205 |
| 2004/0147298 A1 * | 7/2004 | Shinoda | 463/1 |
| 2005/0003882 A1 * | 1/2005 | Nara | 463/16 |
| 2005/0026695 A1 * | 2/2005 | Tsuchiyama et al. | 463/42 |
| 2005/0267610 A1 * | 12/2005 | Shinoda | 700/92 |
| 2007/0054739 A1 * | 3/2007 | Amaitis et al. | 463/42 |
| 2007/0087832 A1 * | 4/2007 | Abbott et al. | 463/42 |

FOREIGN PATENT DOCUMENTS

| | | |
|---|---|---|
| JP | 2000-051524 | 2/2000 |
| WO | 02 078284 | 10/2002 |

OTHER PUBLICATIONS http://web.archive.org/web/*/http://games.yahoo.com/.*
English Language Abstract of JP 11-319319.
U.S. Appl. No. 11/538,573 to Azuma, which was filed on Oct. 4, 2006.
U.S. Appl. No. 11/538,592 to Azuma, which was filed on Oct. 4, 2006.
English language Abstract and partial translation of JP 2000-051524.
"Arcadia (Beatmania II DXII II DX RED)," Enterbrain Inc., vol. 5, No. 12, pp. 36 (Dec. 1, 2004), and an English language partial translation.
"Research Paper by Information Processing Society of Japan 2002-GN-44 (P2P type network game system applied SIONet)," Information Processing Society of Japan, vol. 2002, No. 47, pp. 39-44 (May 24, 2002), and an English language partial translation.
"NTT Technical Journal (P2P type network game system applied SIONet)," Telecommunications Association vol. 14, No. 10, pp. 62-65 (Oct. 1, 2002 ), and an English language partial translation.
"C Magazine (Network game factory, the 5th Creation of fast competitive action game)," Softbank Publishing Corp., vol. 15, No. 1, pp. 123-128 (Jan. 1, 2003), and an English language partial translation.

* cited by examiner

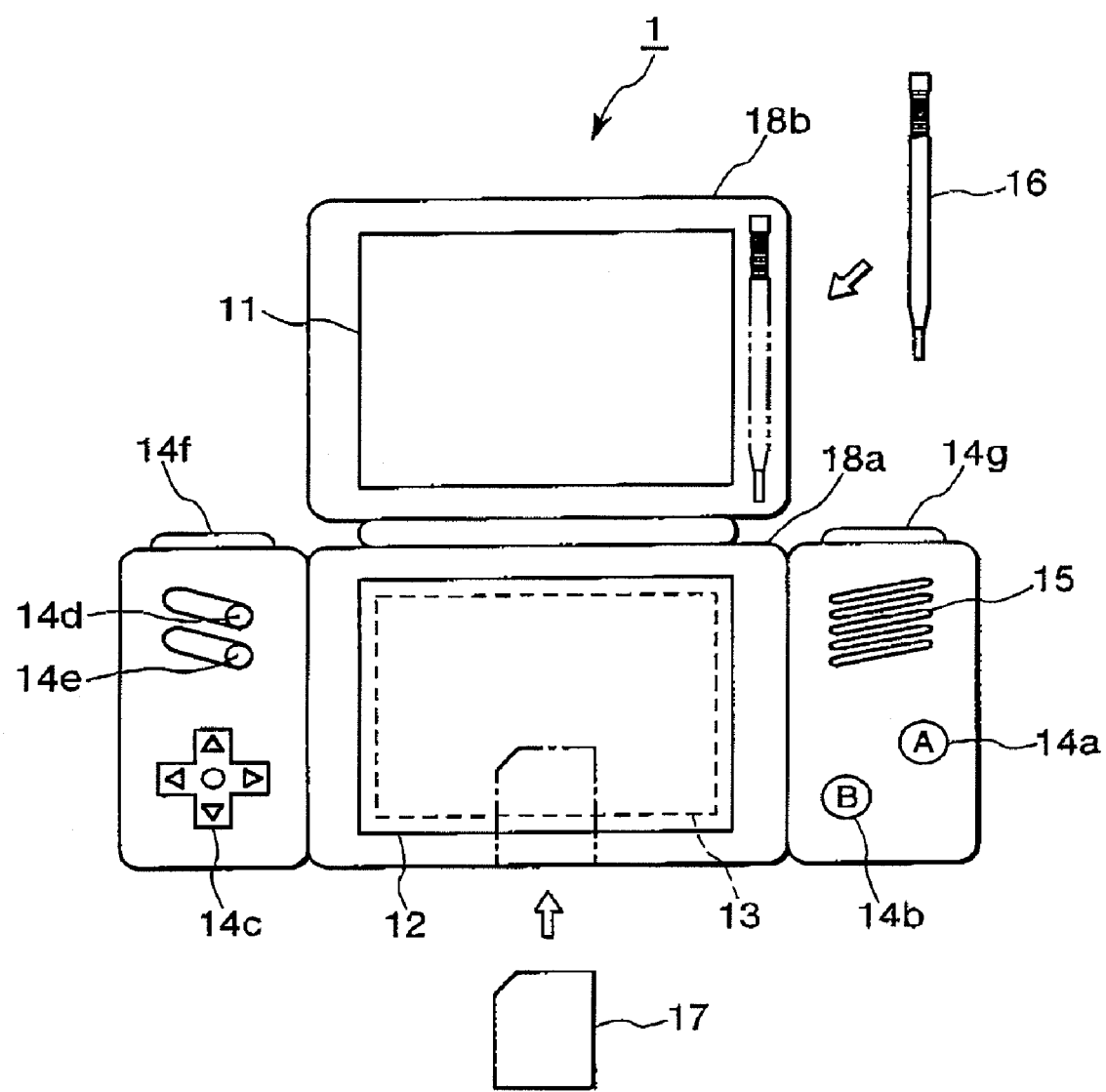

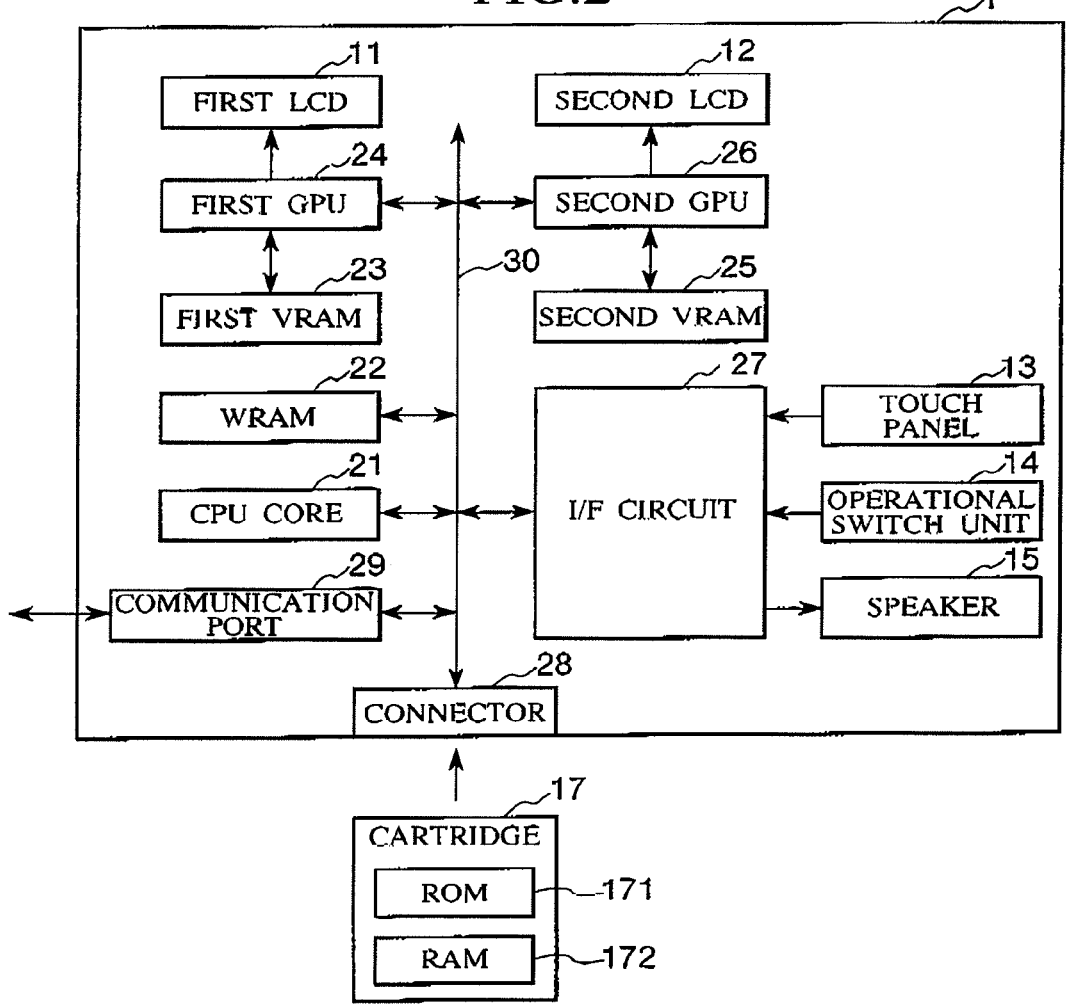

FIG.4A
RANKING TABLE OF USER B

| Name | RANK | Points | Day | FAVORITE FLAG |
|---|---|---|---|---|
| A | 1 | 300 | 2006/01/01 | 0 |
| B | 2 | 100 | — | 0 |
| C | 3 | 60 | — | 0 |
| D | 4 | 50 | — | 0 |
| H | 5 | 40 | 2006/02/02 | 0 |

FIG.4B
RANKING TABLE OF USER G

| Name | RANK | Points | Day | FAVORITE FLAG |
|---|---|---|---|---|
| E | 1 | 400 | — | 0 |
| A | 2 | 350 | 2006/02/01 | 0 |
| F | 3 | 200 | — | 0 |
| G | 4 | 80 | — | 0 |
| H | 5 | 30 | 2006/01/02 | 0 |

FIG.4C
INTEGRATED RANKING TABLE OF USERS B AND G

| Name | RANK | Points | Day | FAVORITE FLAG |
|---|---|---|---|---|
| E | 1 | 400 | — | 0 |
| A | 2 | 350 | 2006/02/01 | 0 |
| F | 3 | 200 | — | 0 |
| B | 4 | 110 | PRESENT DATE | 0 |
| G | 5 | 80 | PRESENT DATE | 0 |
| C | 6 | 60 | — | 0 |
| D | 7 | 50 | — | 0 |
| H | 8 | 40 | 2006/02/02 | 0 |

FIG.9A
RANKING TABLE OF USER E BEFORE COMPETITION

| Name | RANK | Points | Day | FAVORITE FLAG |
|---|---|---|---|---|
| A | 1 | 480 | — | 0 |
| B | 2 | 470 | 2006/02/24 | 0 |
| C | 3 | 450 | — | 1 |
| ⋮ | ⋮ | ⋮ | ⋮ | ⋮ |
| D | 34 | 250 | — | 0 |
| E | 35 | 240 | — | — |
| F | 36 | 190 | 2006/02/26 | 0 |
| ⋮ | ⋮ | ⋮ | ⋮ | ⋮ |
| G | 45 | 100 | — | 0 |
| ⋮ | ⋮ | ⋮ | ⋮ | ⋮ |
| H | 68 | 35 | — | 0 |
| I | 69 | 25 | 2006/02/25 | 1 |
| J | 70 | 10 | 2006/02/23 | 0 |

FIG.9B
RANKING TABLE OF USER D BEFORE COMPETITION

| Name | RANK | Points | Day | FAVORITE FLAG |
|---|---|---|---|---|
| K | 1 | 495 | — | 0 |
| A | 2 | 490 | 2006/02/28 | 0 |
| C | 3 | 470 | 2006/02/29 | 0 |
| ⋮ | ⋮ | ⋮ | ⋮ | ⋮ |
| D | 25 | 255 | — | — |
| L | 26 | 250 | — | 0 |
| M | 27 | 235 | 2006/02/26 | 0 |
| N | 28 | 230 | 2006/02/25 | 1 |

FIG.9C
UPDATED RANKING TABLE OF USER E

| Name | RANK | Points | Day | FAVORITE FLAG |
|---|---|---|---|---|
| A | 1 | 480 | — | 0 |
| B | 2 | 470 | 2006/02/24 | 0 |
| C | 3 | 450 | — | 1 |
| ⋮ | ⋮ | ⋮ | ⋮ | ⋮ |
| E | 34 | 260 | — | — |
| D | 35 | 250 | — | 0 |
| F | 36 | 190 | 2006/02/26 | 0 |
| ⋮ | ⋮ | ⋮ | ⋮ | ⋮ |
| G | 45 | 100 | — | 0 |
| ⋮ | ⋮ | ⋮ | ⋮ | ⋮ |
| H | 68 | 35 | — | 0 |
| I | 69 | 25 | 2006/02/25 | 1 |
| J | 70 | 10 | 2006/02/23 | 0 |

FIG.9D
UPDATED RANKING TABLE OF USER D

| Name | RANK | Points | Day | FAVORITE FLAG |
|---|---|---|---|---|
| K | 1 | 495 | — | 0 |
| A | 2 | 490 | 2006/02/28 | 0 |
| C | 3 | 470 | 2006/02/29 | 0 |
| ⋮ | ⋮ | ⋮ | ⋮ | ⋮ |
| D | 35 | 255 | — | — |
| L | 36 | 250 | — | 0 |
| M | 37 | 235 | 2006/02/26 | 0 |
| N | 38 | 230 | 2006/02/25 | 1 |

FIG.9E
INTEGRATED RANKING TABLE OF USER E

| Name | RANK | Points | Day | FAVORITE FLAG |
|---|---|---|---|---|
| K | 1 | 495 | — | 0 |
| A | 2 | 490 | 2006/02/24 | 0 |
| B | 3 | 470 | — | 0 |
| C | 4 | 470 | — | 1 |
| ⋮ | ⋮ | ⋮ | ⋮ | ⋮ |
| E | 34 | 260 | — | — |
| D | 35 | 255 | PRESENT DATE | 0 |
| L | 36 | 250 | — | 0 |
| M | 37 | 235 | — | 0 |
| N | 38 | 230 | — | 0 |
| F | 39 | 190 | 2006/02/26 | 0 |
| ⋮ | ⋮ | ⋮ | ⋮ | ⋮ |
| I | 69 | 25 | 2006/02/25 | 1 |
| J | 70 | 10 | 2006/02/23 | 0 |

FIG.9F
INTEGRATED RANKING TABLE OF USER D

| Name | RANK | Points | Day | FAVORITE FLAG |
|---|---|---|---|---|
| K | 1 | 495 | — | 0 |
| A | 2 | 490 | 2006/02/28 | 0 |
| C | 3 | 470 | 2006/02/29 | 0 |
| B | 4 | 470 | — | 0 |
| ⋮ | ⋮ | ⋮ | ⋮ | ⋮ |
| E | 34 | 260 | PRESENT DATE | — |
| D | 35 | 255 | — | — |
| L | 36 | 250 | — | 0 |
| M | 37 | 235 | 2006/02/26 | 0 |
| N | 38 | 230 | 2006/02/25 | 1 |
| F | 39 | 190 | — | 0 |
| ⋮ | ⋮ | ⋮ | ⋮ | ⋮ |
| G | 70 | 100 | — | 0 |

CREATION OF RANKING TABLE FOR COMPETITIVE GAME

CROSS REFERENCE TO RELATED APPLICATION

The present disclosure relates to subject matter contained in Japanese Patent Application No. 2006-11545, filed on Jan. 19, 2006, the disclosure of which is expressly incorporated herein by reference in its entirety.

BACKGROUND OF THE INVENTION

1. Field of the Invention

The present invention relates to a game apparatus or the like which creates ranking information including scores obtained by other users with whom a user of the game apparatus has never played a game by transmitting and receiving ranking information to and from another game apparatus.

2. Description of the Related Art

A competitive game is a game that may be played by two or more players and gives each player points according to the player's performance relative to the performance of the other player(s). The player would enjoy a ranking table which would show not only points given as a result of a single competition, but also points given based on results of past competitions in comparison with points obtained by other players. The player's satisfaction becomes greater when the points obtained by the player are ranked higher. Even if the points obtained by the player are ranked higher, the ranking table makes it easier for the player to find another adequate player as an opponent.

In arcade game machines, multiple persons play a game using the same game apparatus, so that a stand-alone type game apparatus, which is not connected to another game apparatus, creates and displays a ranking table of points obtained in the game by individual players. Because unspecified multiple persons play a game with an arcade game machine, however, the player does not understand who got which points even when the ranking table showing the points is displayed. It is difficult for each player to look for another player who matches his or her level based on the point ranking table displayed on the arcade game machine.

While unspecified multiple persons play a game with an arcade game machine, the demographics (such as skills, ages, or so) of the players who play the game apparatus are not balanced depending on the place where the arcade game machine is sited. For example, the concentration of children among entire players may be low or high. If each player believes in a ranking table to be displayed on a stand-alone type arcade game machine, therefore, the player may misjudge his or her actual level in the game.

Japanese Patent Laid-Open Publication No. H11-319319 discloses a network game system which gathers results of games played by players from individual game terminals to a server apparatus via communication lines, and distributes the results tallied in the server apparatus to the individual game terminals. In the network game system, each player can know which level the player is in among other players, particularly, among high-ranked players, without worrying about the demographics of the players.

Because the network game system described in Japanese Patent Laid-Open Publication No. H11-319319 gathers game results over a wide area like all parts of Japan, there are many players to be ranked and the ranking table shows the points of only a limited number of players, such as high-ranked players. In addition, the ranking table contains points of those players who are not likely to be opponents to each player. It is therefore difficult to find an opponent who matches the level of each player from those shown in the ranking table.

To create a ranking table, the network game system described in Japanese Patent Laid-Open Publication No. H11-319319, the server apparatus needs to gather information from each game apparatus. This disadvantageously increases the computer resources that are used in creating a ranking table. After transmitting a game result to the server apparatus, each game terminal stands by to receive a ranking table created by the server apparatus, and cannot therefore execute any valid process until the ranking table is distributed from the server apparatus, thereby wasting the computer resources.

Recent portable game apparatuses have a peer-to-peer connecting capability, so that such a portable game apparatus connects to another game apparatus in a peer-to-peer manner by a cable or wirelessly. Multiple players can play a competitive game with one another using multiple portable game apparatuses connected in a peer-to-peer manner. Such a portable game apparatus is not connected to the server apparatus at the time of playing a competitive game. Even in a case of creating a ranking table, therefore, only the points of other players with whom the player has already played are reflected in the ranking table to be created. This makes it difficult for each player to find an opponent who matches the level of the player from those with whom the player has not yet played based on the ranking table. The same problem would arise in a race game, or such, where scores are shown by times needed to finish a goal, not points.

SUMMARY OF THE INVENTION

Accordingly, it is an object of the present invention to provide a game system, and the like which can create ranking information including scores of other players with whom the player of each game apparatus has not yet played as game apparatuses connected to one another exchange ranking information with one another.

To achieve the object, according to the first aspect of the present invention, there is provided a game system comprising a plurality of game apparatuses that execute a competitive game by transmitting and receiving information with one another. Each game apparatus constituting the game system has a function of providing ranking of scores obtained in the game.

Each game apparatus has a game executing unit that executes the competitive game with another game apparatus of an opponent playing the game while transmitting and receiving information on the game in play to and from the another game apparatus. Each game apparatus also has a local score determining unit that determines a score obtained by a user of the game apparatus based on a result of the game played. Each game apparatus further has a ranking information storage unit that stores ranking information ranking a score obtained by the user in a past game and scores obtained by other users in the game.

Each game apparatus further has a ranking information transmitting unit that transmits the ranking information stored in the game apparatus to the other game apparatus. Each game apparatus further has a ranking information receiving unit that receives the ranking information, stored in the other game apparatus, transmitted therefrom.

Each game apparatus further has a ranking integrating unit that integrates the score determined in the game, the ranking information stored prior to execution of the game, and the ranking information received from the game apparatus to generate new ranking information. Each game apparatus further has a ranking updating unit that updates the stored ranking information to the generated new ranking information. Each game apparatus further has a ranking output unit that outputs the new ranking information.

The ranking information to be stored in the ranking information storage unit may include a score obtained in the game by a user with whom the user of the game apparatus has not played the game in the past.

According to the game system, ranking information stored in the ranking information storing unit of each game apparatus may be integrated based on ranking information obtained from the opponent user, and may include a score obtained by another user with whom the user of the game apparatus has played in the past as well as a score obtained by another user with whom the user of the game apparatus has not played yet. Accordingly, the user of each game apparatus can refer to the score of multiple users other than the past opponents, and can thus easily select a new opponent (including a case of playing with a user with whom the player has played the game in the past).

Provided that users whose game apparatuses have once been connected to each other to play the competitive game with each other are called "friends", all the users whose scores included in the ranking information stored in the ranking information storing unit are users having "friend"-oriented connections with one another, excluding the user of the game apparatus. Even if the user of the game apparatus has not played with other users whose scores are included in the ranking information stored in the game apparatus, those users are likely opponents in the future. The user of each game apparatus can easily find a new opponent from those users who are likely to be actual opponents.

Creating ranking information, including scores obtained through the game by other users with whom each user has never played, needs just two game apparatuses which play a competitive game with each other (of course, the game system of the invention does not exclude a competitive game in which three or more persons participate), without need of a server apparatus for this purpose. This makes it possible to create ranking information, including scores obtained through the game by other users with whom each user has never played, using fewer computer resources.

The score that is determined by the local score determining unit may be a score which is determined based on the result of the present game alone, or a score which is determined based on the results of the past games, including the present game (i.e., a total score newly obtained according to the result of the present game and the past scores). The same is true of a score included in ranking information.

According to the second aspect of the invention, there is provided a game apparatus configured to be connectable to another game apparatus that executes a common competitive game (i.e., the same competitive game). The game apparatus has a function of providing ranking of scores obtained in the game.

The game apparatus has a game executing unit that executes the competitive game with another game apparatus of an opponent playing the competitive game while transmitting and receiving information on the game in play to and from the another game apparatus. The game apparatus also has a local score determining unit that determines a score obtained by a user of the game apparatus based on a result of the game played. The game apparatus further has a ranking information storage that stores ranking information ranking a score obtained by the user of the game apparatus in a past game and scores obtained by other users in the game.

The game apparatus further has a ranking information transmitting unit that transmits the ranking information stored in the game apparatus to the other game apparatus. The game apparatus further has a ranking information receiving unit that receives the ranking information, stored in the other game apparatus, transmitted therefrom.

The game apparatus further has a ranking integrating unit that integrates the score determined in the game, the ranking information stored before execution of the game, and the ranking information received from other the game apparatus to generate new ranking information. The game apparatus further has a ranking updating unit that updates the stored ranking information to the generated new ranking information. The game apparatus further has a ranking output unit that outputs the new ranking information.

The ranking information to be stored in the ranking information storage unit can include a score obtained in the game by a user with whom the user of the game apparatus has not played the game in the past.

According to the third aspect of the invention, there is provided a game apparatus configured to be connectable to another game apparatus that executes a common competitive game (i.e., the same competitive game). The game apparatus has a data memory that stores data, a program memory that stores a program, a processor that executes the program, a communication device that transmits and receives information to and from another game apparatus, and an output device that outputs information.

The data memory stores the ranking information ranking a score obtained by a user of the game apparatus in past games, and scores obtained by other users in the games.

The program includes a code section that executes the competitive game with another game apparatus of an opponent by causing the communication device to transmit and receive information on the game in play to and from the other game apparatus. The program further includes a code section that determiners a score obtained by the user of the game apparatus based on a result of the game played.

The program further includes a code section that causes the communication device to transmit the ranking information stored in the data memory to the other game apparatus. The program further includes a code section that causes the communication device to receive the ranking information transmitted from the other game apparatus to obtain ranking information stored in the data memory of the other game apparatus.

The program further includes a code section that integrates the score determined in the present game, the stored ranking information and the ranking information received from the other game apparatus to generate new ranking information. The program further includes a code section that updates the ranking information stored in the data memory to the generated new ranking information. The program further includes a code section that outputs the generated new ranking information from the output device.

The ranking information stored in the data memory can include a score obtained in the game by a user with whom the user of the game apparatus has not played the game in the past.

The program, which is stored in the program memory in the game apparatus, according to the third aspect of the invention can be recorded on a computer readable recording medium for distribution. The computer readable recording medium may be a recording medium which is so configured as to be attachable/detachable to/from the game apparatus and is provided separate from the game apparatus. The program which is stored in the program memory in the game apparatus according to the third aspect of the invention can be distributed from a server apparatus, present on a network, over the network in the form of a data signal superimposed on a carrier wave.

A ranking information creating method according to the fourth aspect of the invention is executed by a game apparatus having functions of executing a competitive game by transmitting and receiving information to and from another game apparatus which executes the same competitive game, and generating ranking information ranking a score obtained by a user of the game apparatus in past games, and scores obtained by other users in the games and storing the ranking information internally.

The ranking information creating method executes the competitive game with another game apparatus of an opponent by transmitting and receiving information on the game in play to and from the other game apparatus of the opponent. The ranking information creating method determines a score obtained by a user of the game apparatus based on a result of the game played;

The ranking information creating method transmits the ranking information stored in the data memory to the other game apparatus. The ranking information creating method receives the ranking information transmitted from the other game apparatus to obtain ranking information stored in the other game apparatus.

The ranking information creating method integrates the score determined in the game, the stored ranking information, and the ranking information received from the other game apparatus to generate new ranking information. The ranking information creating method updates the ranking information stored internally to the generated new ranking information. The ranking information creating method outputs the generated new ranking information.

The ranking information stored internally can include a score obtained in the game by a user with whom the user of the game apparatus has not played the game in the past.

BRIEF DESCRIPTION OF THE DRAWINGS

FIG. 1 is an external view showing the configuration of a game apparatus which is adapted to an embodiment of the present invention;

FIG. 2 is a block diagram showing the circuit configuration of the game apparatus in FIG. 1;

FIG. 3 is a diagram showing the correlation of total points, grades, and points which a user can get;

FIGS. 4A to 4C are diagrams showing examples of a ranking table displayed on the display screen of the game apparatus;

FIGS. 9A to 9F are diagrams for explaining the details of a ranking table to be displayed on the display screen of the game apparatus.

DETAILED DESCRIPTION OF PREFERRED EMBODIMENT

Figure 5:
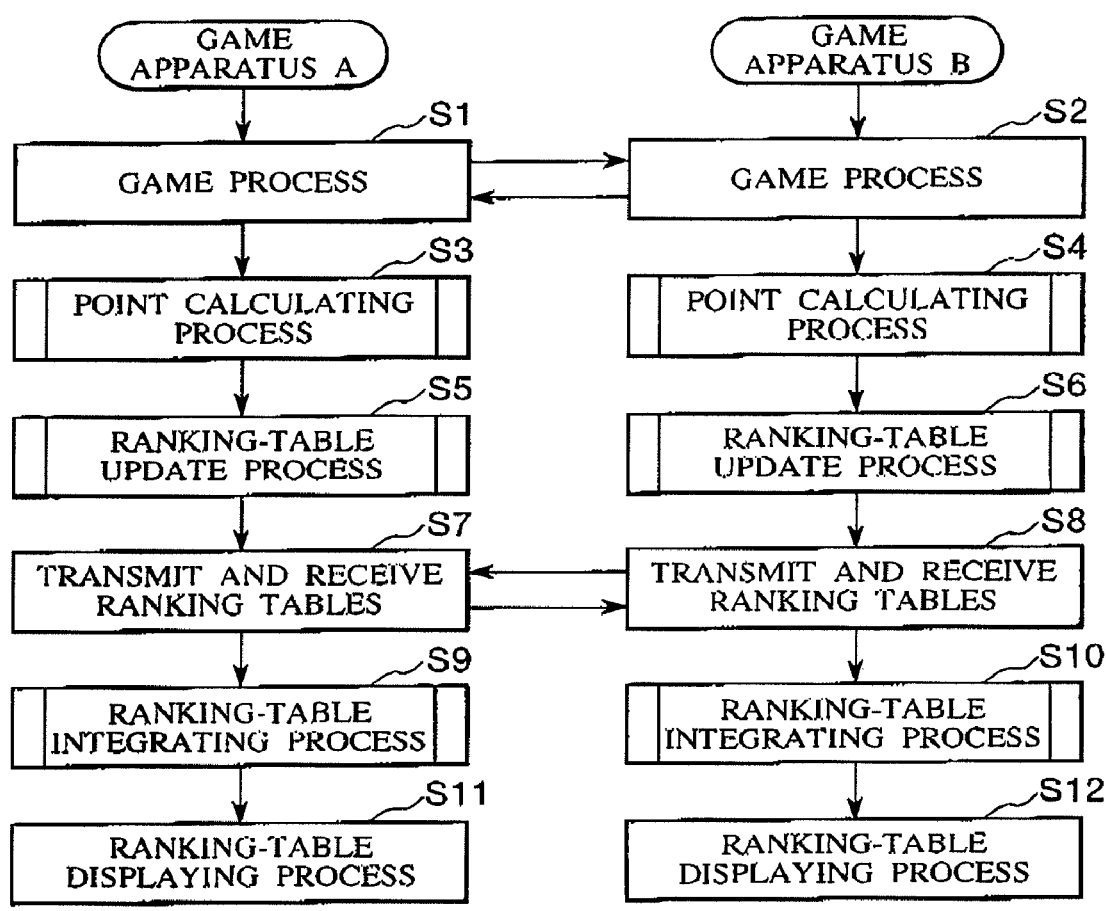
FIG. 5 is a flowchart illustrating processes of a game system according to one embodiment of the invention that are executed by individual game apparatuses in creating ranking tables.

Embodiments of the present invention will be described below with reference to the accompanying drawings.

FIG. 1 is an external view showing an exemplary, non-limiting structure of a game apparatus 1 which is adapted to a game system according to an embodiment of the invention. FIG. 1 shows a portable game apparatus as one example of the game apparatus 1. Referring to FIG. 1, the game apparatus 1 is configured to have two liquid crystal displays (LCDs) 11 and 12 accommodated in a housing 18.

The first liquid crystal display (hereinafter "LCD") 11 and a second LCD 12 are disposed one above the other. The housing 18 includes a lower housing 18a and an upper housing 18b. The upper housing 18b is rotatably supported at a part of the upper side of the lower housing 18a. The upper housing 18b has a planar shape slightly larger than the planar shape of the first LCD 11, and has an opening formed to expose the display screen of the first LCD 11. The lower housing 18a has a planar shape set laterally longer than that of the upper housing 18b, and has an opening formed in the lateral center portion to expose the display screen of the second LCD 12. A sound hole for a speaker 15 is formed in one of side surfaces of the lower housing 18a. An operational switch unit 14 is mounted to the right and left sides of the lower housing 18a, sandwiching the second LCD 12.

The operational switch unit 14 includes a motion switch (A button) 14a, a motion switch (B button) 14b, a direction indicating switch (cross keys) 14c, a start switch 14d, a select switch 14e, a side switch (L button) 14f, and a side switch (R button) 14g. The motion switches 14a and 14b are mounted on one major surface of the lower housing 18a to the right side of the second LCD 12. The direction indicating switch 14c, the start switch 14d and the select switch 14e are mounted on one major surface of the lower housing 18a to the left side of the second LCD 12. The side switches 14f (L button) and 14g (R button) are mounted on the upper surface (upper side face) of the lower housing 18a to both left and right sides thereof.

The motion switches 14a and 14b are used to input a command to take an action, such as, for example, passing or shooting in a basketball game of the embodiment. The direction indicating switch 14c is used to instruct the direction on a game screen, such as instructing the moving direction of a player object (a player character in the embodiment) which is operable by a player using the operational switch unit 14, or instructing the moving direction of a cursor. The direction indicating switch 14c is constituted by cross keys. Two adjoining keys (up and right keys, right and down keys, down and left keys, or left and up keys) in the cross keys of the direction indicating switch 14c can be simultaneously operated. Operating the direction indicating switch 14c, the player can input one of eight directions (up, down, left and right directions specified by manipulation of one key, and upper right, lower right, upper left and lower left directions specified by simultaneous manipulation of adjoining two keys).

A touch panel 13 (broken-line area in FIG. 1) is mounted on the top side of the second LCD 12. The touch panel 13 may be of a resistive film type, an optical system (infrared system) type, or a static capacitance coupling type. The touch panel 13 detects and outputs a coordinate position of a stylus 16 (or the finger of a player) when the player presses or moves the stylus 16 (or possibly a player's finger) on the top side of the touch panel 13. In the basketball game of the embodiment, the touch panel 13 is used to input the dribbling position of a ball where a player character dribbles.

A retaining hole (two-dot chain line area in FIG. 1) for the stylus 16 to operate the touch panel 13 as needed is formed in the vicinity of one side face of the upper housing 18b. The stylus 16 is retained in the retaining hole. Formed in a part of one side face of the lower housing 18a is a cartridge inserting section (one-dot chain line area in FIG. 1) where a game cartridge 17 (hereinafter simply referred to as "cartridge 17") incorporating a memory (ROM or the like) storing a game program is detachably loaded. The cartridge 17 is an information storage medium storing a game program. The cartridge 17 has, for example, a non-volatile semiconductor memory, such as a ROM or a flash memory. A connector (see FIG. 2) for electric connection to the cartridge 17 is provided inside the cartridge inserting section. An electronic circuit board having various electronic parts like a CPU mounted thereon is housed in the lower housing 18a (and/or the upper housing 18b).

The circuit configuration of the game apparatus 1 will now be described. FIG. 2 is a block diagram showing the circuit configuration of the game apparatus 1. Referring to FIG. 2, a CPU core 21 is mounted on the electronic circuit board to be housed in the housing 18. The CPU core 21 is connected with a connector 28 for connection to the cartridge 17, an input/output interface (I/F) circuit 27, a first graphic processing unit (first GPU) 24, a second graphic processing unit (second GPU) 26, a working RAM (WRAM) 22, and a communication port 29 via internal buses 30.

The connector 28 is connected with the cartridge 17 in an attachable/detachable manner. As mentioned above, the cartridge 17 is a storage medium storing a game program. Specifically, the cartridge 17 has a ROM 171 storing the game program and a RAM 172 which stores backup data in a rewritable manner. The game program stored in the ROM 171 of the cartridge 17 is loaded into the WRAM 22 to be executed by the CPU core 21. Temporary data acquired by the CPU core 21 executing the game program and data for generating images are stored in the WRAM 22. Recorded in the ROM 171 is the game program which is a set of commands executable by a computer, particularly, the CPU core 21, of the game apparatus 1, and a group of data to be used by the computer. The game program is loaded into the WRAM 22 from the ROM 171 whenever needed, and is executed by the CPU core 21.

The first GPU 24 is connected with a first video RAM (hereinafter "VRAM") 23. The second GPU 26 is connected with a second VRAM 25. In accordance with an instruction from the CPU core 21, the first GPU 24 generates a first game image based on data for generating images to be stored in the WRAM 22, and writes the first game image in the first VRAM 23. In accordance with an instruction from the CPU core 21, the second GPU 26 generates a second game image based on data for generating images to be stored in the WRAM 22, and writes the second game image in the second VRAM 25.

The first GPU 24 is connected to the first LCD 11, and the second GPU 26 is connected to the second LCD 12. The first GPU 24 outputs the first game image, written in the first VRAM 23 according to an instruction from the CPU core 21, to the first LCD 11. The first LCD 11 displays the first game image output from the first GPU 24. The second GPU 26 outputs the second game image, written in the second VRAM 25 according to an instruction from the CPU core 21, to the second LCD 12. The second LCD 12 displays the second game image output from the second GPU 26.

The I/F circuit 27 is connected with the touch panel 13, the operational switch unit 14 and the speaker 15. The I/F circuit 27 passes data between the CPU core 21 and external input/output devices, such as the touch panel 13, the operational switch unit 14 and the speaker 15. The speaker 15, disposed at a position inward of the sound hole, outputs sounds generated according to the game in play.

The touch panel 13 (including a device driver for the touch panel) has a coordinate system corresponding to the coordinate system of the second VRAM 25. The touch panel 13 outputs coordinate data corresponding to a position input (indicated) with the stylus 16 or the like to a predetermined register provided in the WRAM 22. When the resolution of the display screen of the second LCD 12 is 256 dots×192 dots, for example, the detection accuracy of the touch panel 13 may also be 256 dots×192 dots corresponding to the display screen of the second LCD 12. The detection accuracy of the touch panel 13 may be lower or higher than the resolution of the display screen of the second LCD 12.

The communication port 29 transmits and receives ranking information to and from an external apparatus, such as another game apparatus, a floor type game machine or a server apparatus. The game apparatus 1 can connect to another game apparatus present in a predetermined area in a peer-to-peer manner, and transmit and receive information to and from the another game apparatus via the communication port 29. That is, a plurality of game apparatuses within a predetermined area can communicate with one another without any server apparatus.

The following will describe the process of the game system of the embodiment which is played by the game apparatus 1 shown in FIG. 1. The game which is adopted to the embodiment is a basketball game in which characters of a player team play against characters of an opponent team.

The player plays the game with another user whose game apparatus 1 is present in a predetermined area and connectable in a peer-to-peer manner. That is, the player plays the game with an opponent who moves characters of an opponent team according to his or her operation. Under the peer-to-peer environment, the game can be played with a plurality of game apparatuses present in a predetermined area. It is assumed hereunder that the player plays the game with another user whose game apparatus selected by an instruction from the player.

The game apparatus 1 executes the application program of the game individually for each player or each user. In the following description, a "player" indicates the user who is actually playing (has been playing) the game by operating a player team unless otherwise specified, an "opponent" indicates the user who is actually playing (has been playing) the game by operating an opponent team unless otherwise specified, and a "user" indicates a user who can play the game as a player or an opponent unless otherwise specified.

When the player team is in the offense side, a character in the player team who actually has a ball normally becomes a player character who moves according to an instruction from the player. That is, the player character may change according to the progress of the game.

The characters of the player team including the player character and the characters of the opponent team exist on a basketball game court (hereinafter simply called "court") formed in a virtual three-dimensional (3D) space, and move on the court according to the progress of the game. The ball is also present on the court formed in the virtual 3D space. Each character of the player team (or the opponent team) can carry the ball on the court in the virtual 3D space and put the ball in the basket of the competing team (opponent team for the player team) to get a goal.

The motions of the other characters in the player team are controlled by the CPU core 21 according to the movement of the ball or the player character. The motions of the characters of the opponent team are controlled based on information from the another game apparatus received through the communication port 29. When the player team is in the defense side, or the ball is in the neutral status (no character holds the ball), the player character is determined according to the position of the ball and the positions of the characters of the opponent team. Because this case is not directly relevant to the invention, the description of the case will be omitted.

A user can get points by wining the game. The points obtained by the player are added to the current total points and the resultant total points are stored in the WRAM 22. The maximum total points are 500 points. A user who has gotten the total points of 500 cannot get points even if the user wins the game with another game apparatus thereafter, and the value of the total points does not change.

Individual users are classified into predetermined ranks according to the stored total points. FIG. 3 shows the correlation of the total points, grades, and points which a user can get. As illustrated, there are a total of five grades according to the value of the total points. When the value of the total points is between 0 and 99, the user belongs to grade 1, when the value of the total points is between 100 and 199, the user belongs to grade 2, when the value of the total points is between 200 and 299, the user belongs to grade 3, when the value of the total points is between 300 and 399, the user belongs to grade 4, and when the value of the total points is between 400 and 500, the user belongs to grade 5.

The points that the player gets when winning the game changes according to the grade to which the opponent belongs. When the player beats an opponent of grade 1, the player gets 10 points. When the player beats an opponent of grade 2, the player gets 15 points. When the player beats an opponent of grade 3, the player gets 20 points. When the player beats an opponent of grade 4, the player gets 25 points. When the player beats an opponent of grade 5, the player gets 30 points. In other words, the higher the grade to which the opponent belongs, the higher the points the player can get when winning the game. Even if the player loses the game, the total points do not decrease.

The WRAM 22 of each game apparatus 1 (and/or the RAM 172 of the cartridge 17) stores ranking table data in which the results of games with a plurality of users are replaced with points. FIGS. 4A to 4C are diagrams showing examples of a ranking table displayed on the display screen (first LCD 11 or second LCD 12) of the game apparatus 1. The ranking table associates a Name indicative of each user, a Rank indicative of a rank in the ranking table, total points, a Day, and a Favorite flag of the presence/absence of a Favorite registration with one another as single user data, and displays pieces of user data in a descending order of the total points.

The ranking table of each user should always have the rank and the total points of the user, with the Day and the Favorite flag not being set. The Name may be anything which indicates a user, such as, for example, a machine ID provided for each game apparatus 1, or a user name provided for each user. Where different pieces of user data have the same total points, the pieces of user data which have been registered earlier in the ranking table are ranked higher. Thus, the different pieces of user data with the same total points are not ranked the same.

The Day shows the latest playing date of playing the game with a corresponding opponent when the game ends. The Day for another user who has not yet played the game with the user is internally stored in the WRAM 22, but is not shown in the ranking table. As shown in the ranking table (FIG. 4A) displayed on the game apparatus 1 of user B, the user B has played with users A and H. The user A had the total points of 300 at the end of the game on Jan. 1, 2006. The user H had the total points of 40 at the end of the game on Feb. 2, 2006. The user B has never played the game with users C and D.

The Favorite flag has a value of "0" in an initial state, and the value becomes "1" as the user makes a Favorite registration. As the user operates the touch panel 13, or the operational switch unit 14, to make the Favorite registration, the piece of user data whose Favorite flag has been set will not be erased from the ranking table. The user can make a Favorite registration of a predetermined number of (70 or less) pieces of user data.

A maximum of 70 pieces of user data may be shown in the ranking table in a descending order of total points. When the number of pieces of user data exceeds "70", pieces of user data of other users who have not played the game with the user would be erased one by one in an ascending order of total points, then pieces of user data of other users who have played the game with the player would be erased one by one in an ascending order of total points. It is to be noted that the piece user data of the player, and the pieces of user data whose Favorite flags are set are not erased even if the value of the total points is low.

Every time the game is terminated, the ranking table is updated according to the game result in each of the game apparatuses of the player and the opponent. The updated ranking tables are exchanged with the game apparatuses of the player and the opponent via the communication ports 29 of the game apparatuses 1. The updated ranking table of the player is integrated with the ranking table received from the game apparatus of the opponent, yielding a new ranking table which is registered in the WRAM 22 (and/or the RAM 172). The update and integration of ranking tables will be explained referring to FIGS. 4A to 4C.

In the initial state, the ranking table shown in FIG. 4A may be displayed on the display screen of the game apparatus 1 of the user B, and the ranking table shown in FIG. 4B may be displayed on the display screen of the game apparatus 1 of user G. As shown in FIG. 4A, the ranking table of the user B includes pieces of user data of users A, B, C, D and H. Since the Day fields for the users A and H contain data, the users A and H have played the game with the user B. As shown in FIG. 4B, the ranking table of the user G includes pieces of user data of users E, A, F, G and H. Since the Day fields for users A and H contain data, the users A and H have played the game with the user G.

The ranking table of each user should include pieces of user data of the user. That is, the ranking table of the user B, shown in FIG. 4A, includes the piece of user data of the user B, and the ranking table of the user G, shown in FIG. 4B, includes the piece of user data of the user G.

It is assumed that the game apparatuses 1 of each of the users B and G are connected in a peer-to-peer manner via the communication ports 29 of each game apparatus, and that they have played the game with each other. It is also assumed that the user B, who won the game, had gotten 10 points. At the end of the game, the game apparatuses 1 of each of the users B and G execute a ranking-table update process to update the total points according to the game result.

In the ranking-table update process, a winner gets points to be added to the total points (it is assumed in the embodiment that the points of a loser do not change). The obtained 10 points increase the total points of the user B to 110 points.

Because the total points of the user B are not equal to or greater than the 300 points of the user A who outranks the user B by one, the rank of the user B does not change. Because the total points of the user G, who has lost the game, do not change, the rank of the user G in the ranking table does not change either. Thereafter, each of the game apparatuses 1 of the users B and G exchange the updated ranking table to the opponent via the communication port 29 of each apparatus, but do not exchange the Favorite flag in each piece of user data.

The game apparatus 1 of the user B integrates the user data in the received ranking table of the player G and the user data in the ranking table of the player B, and displays the new ranking table (FIG. 4C) on the display screen. When a piece of user data of the same Name as that of a piece user data already registered in the ranking table is included in the received ranking table at the time of integrating the ranking table, the newer piece of user data is left in the integrated ranking table.

The users A and H are both registered in the ranking table of the user B, as well as in the ranking table of the user G. For example, comparing the contents of the Day fields of the users A and H with one another, the Day of the user A, which is originally registered in the ranking table of the user G, is newer. In this case, the piece of user data of the user A, in the ranking table of the user B, will be overwritten with the piece of the user data of the user A registered in the ranking table of the user G. The Day of the user H, which is originally registered in the ranking table of the user B, is newer than the Day of the user H registered in the ranking table of the user G. In this case, the piece of user data of the user H is registered directly in the ranking table of the user B. The game apparatus 1 of the user G likewise integrates the ranking tables.

In FIG. 4C, in the ranking table of the user B, the current (present) date is shown in the Day field of the piece of the user data of the user G, who was the opponent of the user B, and the Day field of the user data of the user B is not set. In the ranking table of the user G, the current date is shown in the Day field of the piece of the user data of the user B who was the opponent of the user G, and the Day field of the user data of the user G is not set.

As apparent from the above, each game apparatus 1 plays the game with the game apparatus 1 of another user and updates (creates) the ranking table according to the game result. Then, the game apparatus 1 transmits and receives the updated ranking table to and from the game apparatus of the opponent, and integrates the received ranking table with the updated ranking table.

The following will describe exemplary, non-limiting processes in the game system according to the embodiment. The process flow of the game system includes processes, such as, for example, playing the game, and calculation of points originating from winning or losing the game. The following will explain only those processes relevant to the invention, i.e., only the ranking, creating process of playing the game with an opponent, and integrating ranking tables after updating the ranking tables.

It is necessary that the game apparatus 1 of the player, and the game apparatus 1 of the opponent, should be present in a predetermined area where each of the game apparatuses 1 should be connectable in a peer-to-peer manner. The game apparatuses 1 may be connected with each other in a peer-to-peer relationship to execute the game, update ranking tables according to the game result, transmit and receive the updated ranking tables to and from each other, and integrate the updated ranking tables with the received ranking tables. The processes needed to create a ranking table will be explained below. The following explanation is premised on that the game apparatus 1 of the player, and the game apparatus 1 of the opponent, are both present in a predetermined area where the game apparatuses 1 are connectable in a peer-to-peer manner. It is assumed that the values of various parameters used in the following description are temporarily stored in the WRAM 22 subjected to the processes. For the scheme of temporarily storing the values of various parameters in the WRAM 22, any temporary storage scheme may be used as the skilled artisan will readily recognize without departing from the spirit and/or scope of the invention.

FIG. 5 is a flowchart illustrating processes that are executed by individual game apparatuses 1. In the description of this flowchart, a game apparatus A and a game apparatus B are connected to each other to execute the game. The user of the game apparatus A is ranked u-th in the ranking table registered in the game apparatus A, where u is a positive integer. Likewise, the user of the game apparatus B is ranked u-th in the ranking table registered in the game apparatus B. First, the user of the game apparatus A designates the user of the game apparatus B as an opponent and inputs the necessary information by operating the touch panel 13, or the operational switch unit 14. The CPU core 21 then transmits a game request command from the communication port 29 of the game apparatus A to the communication port 29 of the game apparatus B. When the game apparatus B, whose user has been designated as the opponent, receives the game request command, the CPU core 21 of the game apparatus B displays the game request command on the display screen and waits for an instruction sent in response to the player's operation of the touch panel 13, or the operational switch unit 14, to indicate whether or not to start the game with the user of the game apparatus A. Upon reception of the instruction to start the game from the player, the CPU core 21 of the game apparatus B transmits a game start command to the game apparatus A from the communication port 29. Then, the game apparatuses A, B execute the game playing process (steps S1, S2). At this time, the users of game apparatuses A and B become players (opponents of the player B and A, respectively) A and B of the game. Since the game playing process is not directly relevant to the invention, its detailed description will be omitted.

When the game process is terminated, the CPU core 21 of each game apparatus A, B executes a point calculating process of accumulating the total points of a winner according to the result of playing the game (steps S3, S4). The details of the point calculating process will be described later. The CPU core 21 of each of the game apparatuses A, B executes the ranking-table update process of updating the ranking table thereof according to the total points calculated in the point calculating process (steps S5, S6). The details of the ranking-table update process will be described later.

Thereafter, the CPU cores 21 of the game apparatuses A, B transmit and receive the updated ranking tables to and from each other (steps S7, S8). The CPU core 21 of each of the game apparatuses A, B integrates the updated ranking table with the received ranking table, and stores the integrated ranking table in the WRAM 22 (and/or the RAM 172) (steps S9, S10). The details of the ranking-table integrating process will be described later. The CPU core 21 of each game apparatus displays the integrated ranking table on the display screen of the first LCD 11 or the second LCD 12 (steps S11, S12).

Figure 6:
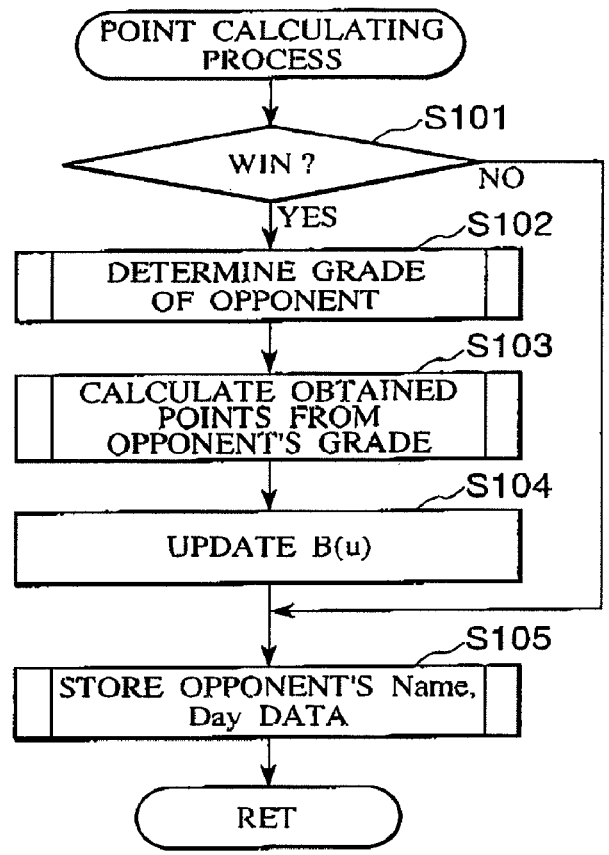
FIG. 6 is a flowchart illustrating a point calculating process in FIG. 5 in detail.

FIG. 6 is a flowchart illustrating the point calculating process of each of the steps S3, S4 of FIG. 5 in detail. In the point calculating process, the CPU core 21 of each the game apparatuses A, B determines whether or not its player has won the game as the result of the game playing process (step S101).

When its player has not won the game ("NO" in step S101), the CPU core 21 goes directly to the process of step S105. When its player has won the game ("YES" in step S101), the CPU core 21 determines to which one of grades 1 to 5 the grade of the opponent belongs by referring to the correlation between the total points and the grade in FIG. 3 (step S102), and calculates points obtainable by the winner according to the grade of the opponent (step S103). Thereafter, the CPU core 21 adds the obtained points to the total points of the player (user at the u-th rank) in the ranking table thereof to update total points B(u) of the player (step S104). Then, the CPU core 21 goes to the process of step S105.

Hereunder, "B data" indicates user data in the ranking table originally registered in the game apparatus 1 of the player, and "N data" indicates user data in the ranking table received from the game apparatus 1 of the opponent after the game ends. "B(b) data" indicates the piece of user data at the b-th rank (b being an arbitrary integer equal to or greater than 1) in the ranking table in the game apparatus 1 of the player, and B(b) in particular indicates the value of the total points of B(b) data. Likewise, "N(b) data" indicates the piece of user data at the b-th rank (b being an arbitrary integer equal to or greater than 1) in the ranking table received from the game apparatus of the opponent after the game ends, and N(b) in particular indicates the value of the total points of N(b) data.

In step S105, the CPU core 21 stores the Name indicative of the opponent with whom the player has played the game, and the Day indicative of the latest game playing date in the WRAM 22 in association with each other. The CPU core 21 then terminates the point calculating process and returns to the flowchart of FIG. 5.

Figure 7:
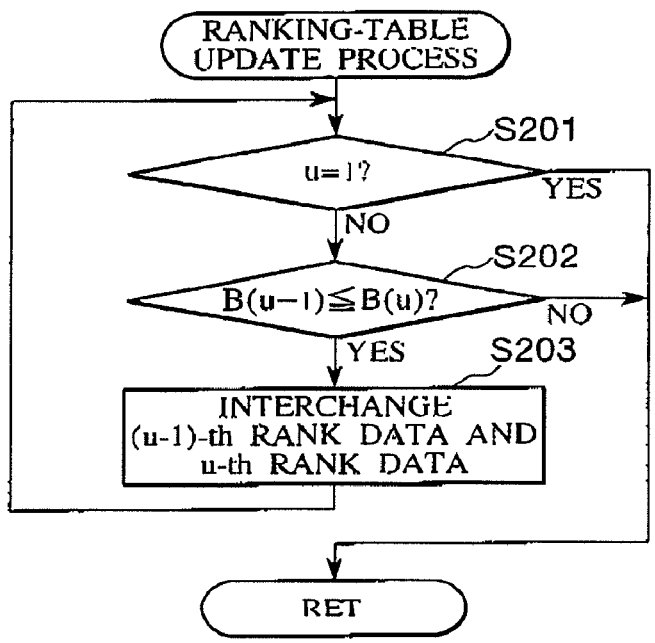
FIG. 7 is a flowchart illustrating a ranking-table update process in FIG. 5 in detail.

FIG. 7 is a flowchart illustrating the details of the ranking-table update process of each of the steps S5, S6 of FIG. 5. In the ranking-table update process, the CPU core 21 determines whether or not the rank of the player (user at the u-th rank) in the ranking table is first (step S201). When the player's rank is first ("YES" in step S201), the CPU core 21 terminates the ranking-table update process and returns to the flowchart of FIG. 5. If the present game is the first game for the player ("NO" in step S201), the player is ranked first as the initial value.

When the player's rank is not first ("NO" in step S201), the CPU core 21 compares the total points B(u−1) at a rank ((u−1)-th rank) higher than the player's rank by one with the total points B(u) of the player, and determines whether or not B(u) is equal to, or greater than B(u−1) (step S202). When B(u) is less than B(u−1) ("NO" in step S202), the CPU core 21 terminates the ranking-table update process and returns to the flowchart of FIG. 5.

When B(u) becomes equal to or is greater than B(u−1) ("YES" in step S202), the CPU core 21 interchanges the piece of user data at the (u−1)-th rank in the ranking table and the piece of user data at the u-th rank with each other. As a result, the rank of the user data of the player in the ranking table rises by one (step S203). Thereafter, the CPU core 21 returns to the process of step S201.

Figure 8:
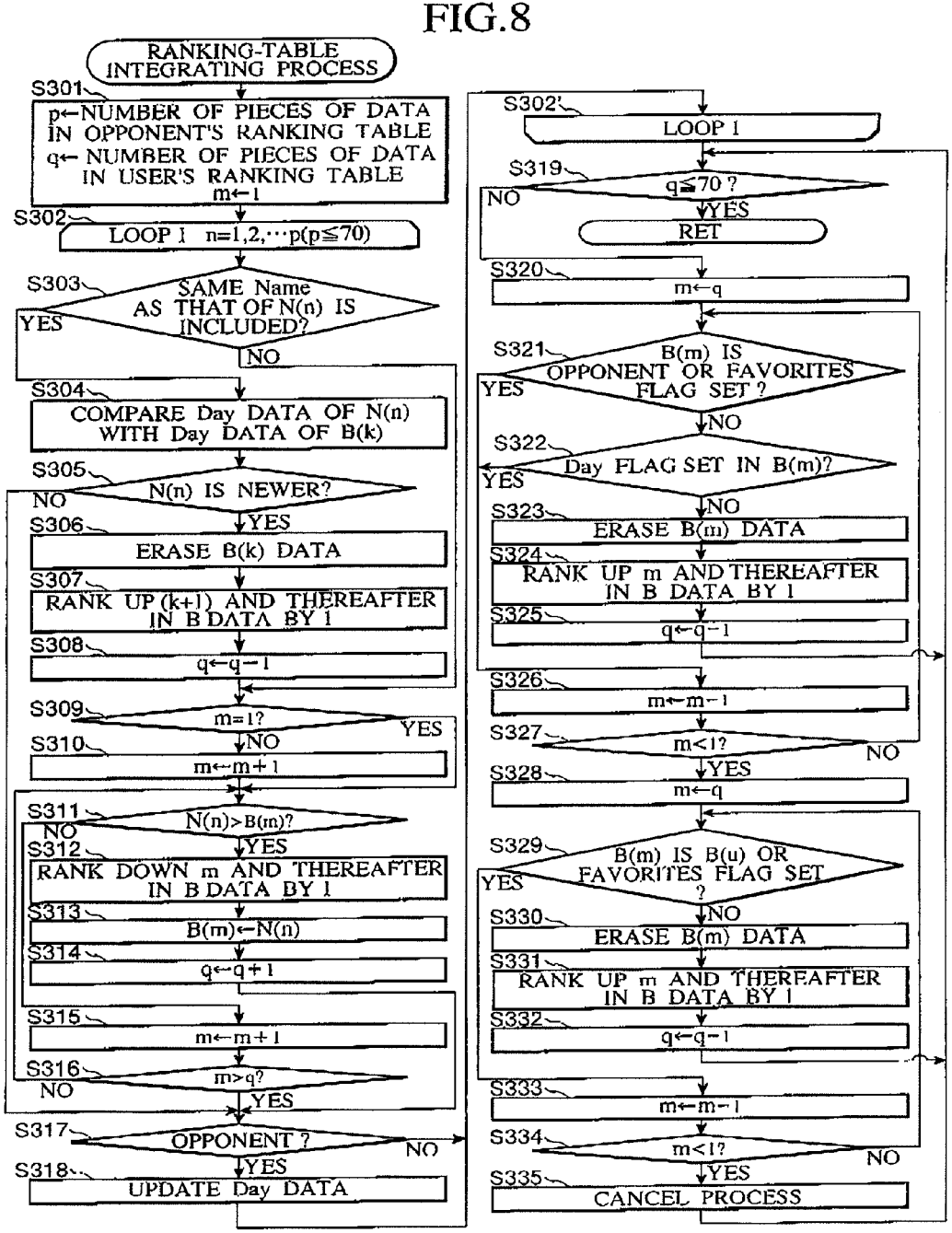
FIG. 8 is a flowchart illustrating a ranking-table integrating process in FIG. 5 in detail.

FIG. 8 is a flowchart illustrating the details of the ranking-table integrating process of each of the steps S9, S10 of FIG. 5. In the ranking-table integrating process, the CPU core 21 sets the number of piece of user data registered in the ranking table of the opponent received via the communication port 29 to variable p, the number of user data registered in the ranking table of the player to variable q, and "1" to variable m (step S301).

The CPU core 21 performs a loop process while sequentially changing the value of a variable n to 1, 2, ..., p (where p≦70; p being an integer equal to or greater than 0). That is, the CPU core 21 performs the individual process by the number of pieces of user data in a descending order of ranks of users registered in the ranking table received from the game apparatus 1 of the opponent in the loop process (steps S302 to S302').

Within the loop, the CPU core 21 determines whether or not the Name of any piece of the user data registered in the player's ranking table includes the same Name as the Name of the piece of the user data (N(n) data) registered at the n-th rank in the ranking table received from the opponent (step S303). When the same Name is not included ("NO" in step S303), the CPU core 21 goes to the process of step S309. When the same Name is included (it is assumed that the Name in the N(n) data matches with the in the B(k) data; k being an arbitrary integer) ("YES" in step S303), the CPU core 21 compares the Day in the N(n) data with the Day in the B(k) data (step S304), and determines whether or not the Day in the N(n) data is newer than the Day in the B(k) data (step S305).

When the Day in the N(n) data is not newer than the Day in the B(k) data ("NO" in step S305), the CPU core 21 goes to the process of step S317. When the Day in the N(n) data is newer than the Day in the B(k) data ("YES" in step S305), the CPU core 21 erases the B(k) data from the player's ranking table (step S306). If the Favorite flag and/or the Day are set in the B(k) data, the CPU core 21 sets the Favorite flag and/or the Day in the N(n) data (step S306).

Next, the CPU core 21 raises the rank of each piece of user data from the (k+1)-th rank to the q-th rank registered in the player's ranking table by one. That is, data piece at the (k+1)-th rank is set to the k-th rank, data piece at the (k+2)-th rank is set to the (k+1)-th rank, ..., and piece data at the q-th rank is set. to the (q−1)-th rank (step S307). Then, the CPU core 21 sets (q−1) to variable q (step S308). Then, the CPU core 21 goes to the process of step S309.

In step S309, the CPU core 21 determines whether or not the value of variable m is "1". When the value of variable m is "1" ("YES" in step S309), the CPU core 21 goes to the process of step S311. When the value of variable m is not "1" ("NO" in step S309), the CPU core 21 sets (m+1) to variable m (step S310). Then, the CPU core 21 goes to the process of step S311.

In step S311, the CPU core 21 compares total points N(n) of the N(n) data included in the ranking table received from the opponent with the total points B(m) of B(m) data included in the player's ranking table and determines whether or not N(n) is greater than B(m).

When N(n) is greater than B(m) ("YES" in step S311), the CPU core 21 lowers the rank of each piece of user data from the m-th rank to the q-th rank registered in the player's ranking table by one (step S312). That is, the data piece at the m-th rank is set to the (m+1)-th rank, the data piece at the (m+1)-th rank is set to the (m+2)-th rank, ..., and the data piece at the q-th rank is set to the (q+1)-th rank (step S312). Then, the CPU core 21 sets the piece of user data at the n-th rank in the N data to m-th rank in the B data (step S313), and sets (q+1) to the variable q (step S314). Then, the CPU core 21 goes to the process of step S317.

When N(n) is not greater than B(m) ("NO" in step S311), the CPU core 21 sets (m+1) to the variable m (step S315) and determines whether or not the value of variable m is greater than the value of the variable q (step S316). When the value of variable m is not greater than the value of the variable q ("NO" in step S316), the CPU core 21 returns to the process of step S311. When the value of variable m is greater than the value of the variable q ("YES" in step S316), the CPU core 21 goes to the process of step S317.

In step S317, the CPU core 21 determines whether or not the N(n) data indicates the opponent with whom the player has just finished playing the game. When the N(n) data indicates the opponent with whom the player has just finished playing the game ("YES" in step S317), the CPU core 21 registers the Day data stored in step S105 to the Day field of N(n) (step S318). Then, the CPU core 21 goes to the process of step S302'. When N(n) data does not indicate the opponent ("NO" in step S317), the CPU core 21 goes directly to the process of step S302'.

In step S302', if the value of the variable n has not been changed up to the value of the variable p, the CPU core 21 updates the value of the variable n and executes the processes in the loop again. If the value of the variable n has been changed up to the value of the variable p, the CPU core 21 goes to the process of step S319. In step S319, the CPU core 21 determines whether or not the value of the variable q is equal to or smaller than 70. When the value of the variable q is equal to or smaller than 70 ("YES" in step S319), the CPU core 21 terminates the ranking-table integrating process and returns to the flowchart of FIG. 5.

When the value of the variable q is greater than 70 ("NO" in step S319), the CPU core 21 sets the value of the variable q to the variable m (step S320). Then, the CPU core 21 determines whether B(m) indicates the opponent with whom the player has finished playing the game a little while ago or whether the Favorite flag is set in B(m) (step S321). When B(m) does not indicate the opponent, and the Favorite flag is not set in B(m) ("NO" in step S321), the CPU core 21 determines whether or not the Day is set in B(m) (step S322)

When the Day is not set in B(m) ("NO" in step S322), the CPU core 21 erases the B(m) data (step S323), and raises the ranks of each piece of user data from the (m+1)-th rank to the q-th rank in the B data registered in the player's ranking table by one. That is, the data piece at the (m+1)-th rank is set to the m-th rank, the data piece at the (m+2)-th rank is set to the (m+1)-th rank, . . . , and the data piece at the q-th rank is set to the (q−1)-th rank (step S324). Next, the CPU core 21 sets (q−1) to the variable q (step S325). Then, the CPU core 21 returns to the process of step S319.

When B(m) indicates the opponent, or when the Favorite flag is set in B(m) ("YES" in step S321), or when the Day, is set in B(m) ("YES" in step S322), the CPU core 21 sets (m−1) to the variable m (step S326). Then, the CPU core 21 determines whether or not the value of variable m is smaller than "1" (step S327). When the value of variable m is equal to or greater than "1" ("NO" in step S327), the CPU core 21 returns to the process of step S321. When the value of variable m is smaller than "1" ("YES" in step S327), the CPU core 21 sets the value of the variable q to the variable m (step S328).

Next, the CPU core 21 determines whether B(m) indicates the opponent with whom the player has just finished playing the game, or whether the Favorite flag is set in B(m) (step S329). When the B(m) does not indicate the opponent, and when the Favorite flag is not set in B(m) ("NO" in step S329), the CPU core 21 erases the B(m) data (step S330), and raises the ranks of each piece of user data from the (m+1)-th rank to the q-th rank in the B data registered in the player's ranking table by one (step S331). Next, the CPU core 21 sets (q−1) to the variable q (step S332). Then, the CPU core 21 returns to the process of step S319.

When the B(m) indicates the opponent, or when the Favorite flag is set in B(m) ("YES" in step S329), the CPU core 21 sets (m−1) to the variable m (step S333). Then, the CPU core 21 determines whether or not the value of the variable m is smaller than "1" (step S334). When the value of variable m is equal to or greater than "1" ("NO" in step S334), the CPU core 21 returns to the process of step S329. When the value of variable m is smaller than "1" ("YES" in step S334), the CPU core 21 executes a cancel process (step S335), then returns to the process of step S319. In the cancel process of step S335, as 70 pieces of user data registrable in the ranking table become full, a process of cancellation of a Favorite registration is executed.

Referring to FIGS. 9A to 9F, the details of the ranking table which is displayed on the display screen in the game system will be explained below. FIGS. 9A and 9B respectively show examples of ranking tables to be displayed on the display screens of the game apparatuses 1 of the user E and the user D before the game. 70 pieces of user data for 70 persons from the user A to user J are registered in the ranking table of the user E in FIG. 9A. As the Day data of the users B, F, I and J are shown, the users B, F, I and J have played the game with the user E. For the users C and I, the Favorite flag is set. 28 pieces of user data for 28 persons from the user K to user N are registered in the ranking table of the user D in FIG. 9B. As the Day data of the users A, C, M and N are shown, the users A, C, M and N have played the game with the user D. For the user N, the Favorite flag is set.

It is assumed that the user E and the user D have connected their game apparatuses 1 in a peer-to-peer manner via the communication ports 29 and have played the game with each other, and that the user E has won the game and gotten 20 points. At the end of the game, the ranking table of the user E becomes what is shown in FIG. 9C, and the ranking table of the user D becomes what is shown in FIG. 9D.

Referring to the ranking table of the user E of FIG. 9C, the obtained 20 points increase the total points of the user E to 260 points. Because the total points "260" of the user E, who was the 35-th rank in FIG. 9A, exceed the total points of 250 of the user D, who was the 34-th rank, the rank of the user E becomes higher than the rank of the user D in FIG. 9C. That is, the rank of the user E becomes 34-th and that of the user D becomes 35-th. Because the total points of the user D, who has lost the game, do not change, the total points and the rank of the user D in the ranking table do not change between FIG. 9B and FIG. 9D.

After the process of updating the ranking table, each game apparatus 1 of the users E and D exchanges the updated ranking table via the communication port 29 with each other.

The game apparatus 1 of the user E integrates the pieces of user data in the received ranking table and the pieces of user data in the registered ranking table, and displays the new ranking table (shown in FIG. 9E) on the display screen. The game apparatus 1 of the user D integrates the pieces of user data in the received ranking table and the pieces of user data in the registered ranking table, and displays the new ranking table (shown in FIG. 9F) on the display screen.

Of the users in the updated ranking tables shown in FIGS. 9C and 9D, the user K, who has the highest total points of 490, is shown at the first rank in the integrated ranking tables shown in FIGS. 9E and 9F. Because the user K has never played the game with both the users E and D, the Day of the user K is not shown in either of the integrated ranking tables shown in FIGS. 9E and 9F. The user A, who has the second highest total points of 490, is shown at the second rank in the integrated ranking tables.

The data of the user A with the total points of 480 in the updated ranking table shown in FIG. 9C is changed to the data with the total points of 490 in the integrated ranking table shown in FIG. 9E. Because the user A is the user who has never played the game with the user E, the Day data of the user A is not shown in FIG. 9E. Whereas the user A is the user who has played the game with the user D, the Day data of the user A is shown in FIG. 9F.

The users B and C have the next highest total points of 470. Because the user B was at a higher rank than the user C in the updated ranking table shown in FIG. 9C, the user C does not outrank the user B in the integrated ranking table shown in FIG. 9E. Because the user C has never played the game with the user E, the Day data of the user C is not shown in FIG. 9E.

Because the user C is already registered, but the user B was not in the updated ranking table shown in FIG. 9D, the user B, who is newly registered, does not outrank the user C in the integrated ranking table shown in FIG. 9F. Because the user B has never played the game with the user D, the Day data of the user B is not shown in FIG. 9F. In the integrated ranking table shown in FIG. 9E, the current date is set to the Day of the user D, who has just played the game with the user E. Likewise, in the integrated ranking table shown in FIG. 9F, the current date is set to the Day of the user E.

A maximum of 70 pieces of user data can be registered in a ranking table. In FIG. 9E, since the user J, whose Favorite flag is not set, has played the game with the user E, another user who has not played with the user E is erased by priority. Since the Favorite flag of the user I is set, the piece of the user data of the user I will not be erased. Because the Day and the Favorite flag of the user H are not set, the piece of the user data of the user H will be erased from the ranking table. As a result, the user J becomes the 70-th rank and the user I becomes the 69-th rank, in the integrated ranking table of FIG. 9E.

Since 28 pieces of user data are registered in the updated ranking table of FIG. 9D, the user G who is registered at the 45-th rank in the updated ranking table of FIG. 9C becomes the 70-th rank in the integrated ranking table of FIG. 9F.

According to the game system of the embodiment, as described above, the game apparatus 1 connects to another game apparatus in a peer-to-peer manner via the communication port 29, plays a game therewith, and obtains points according to the result of playing the game. The game apparatus 1 adds the obtained points to its total points to update the stored ranking table. Thereafter, the game apparatus 1 transmits a locally updated ranking table to the game apparatus 1 of the opponent, and receives a ranking table updated by the game apparatus 1 of the opponent. The game apparatus 1 can create a new ranking table by integrating the stored ranking table with the received ranking table.

A maximum of 70 pieces of user data are registrable in a ranking table. If the total of the number of pieces of user data already registered in the player's ranking table and the number of pieces of the user data already registered in the ranking table received from the opponent is less than 70, all of the pieces of user data may be included in the new ranking table. Having obtained the opponent's ranking table after playing a game, the user can efficiently obtain a lot of pieces of user data, including the user data of other users with whom the user has not played the game yet. The user can easily look for a new opponent (including a case of competing with a user with whom the player has played the game in the past) from the user data registered in the integrated ranking table.

When the player plays the game with another user as an opponent, the game apparatus 1 of the player is connected to another game apparatus 1 of the opponent under the peer-to-peer communications environment. The ranking table that is received from the opponent's game apparatus includes the user data of users with whom the opponent has played the game under the peer-to-peer communications environment and are potential users with whom the player can play the game. Acquisition of the user data under such a communication environment can allow the player to efficiently obtain user data of users with whom the player can directly play the game, and to easily look for a new opponent.

To create a ranking table, including the user data of users with whom the player has not yet played the game, the game apparatus 1 of each user has only to establish information communications with the game apparatus 1 of another user in a peer-to-peer manner, and need not exchange information therewith via a server. This system does not need a computer environment, such as a server and a communication line to connect thereto, and can create a ranking table including user data of other users, with whom the player has not yet played the game, with fewer computer resources.

The ranking table shows pieces of user data in the descending order of total points. Therefore, the user of each game apparatus 1 can easily grasp where the ranking of his or her own points is positioned relative to the other users. More so, users with higher points to be obtained by winning a game are shown in upper portions of the ranking table, which contributes to increasing each player's will to get points and participate in the game.

The maximum number of pieces of user data registrable in a ranking table is 70. Setting the number of pieces of user data registrable in a ranking table this way can prevent the number of pieces of user data from becoming extremely large and can suppress the memory capacity of the WRAM 22, or the like, needed to store the ranking table.

When the received ranking table includes a piece of user data having the same Name as that of any piece of user data already registered in the player's ranking table, the piece of user data is updated to whichever user data is newer (the Day internally stored is overwritten with the new user data). For the same user data, older data is erased and overwritten with new data so that user data can be displayed without redundancy. Under the aforementioned communication environment, it is likely that the user data of the same user is contained in the player's ranking table, as well as the opponent's ranking table. Therefore, integrating the ranking tables can allow the player to grasp the latest data of other users from the opponent's ranking table, making it possible to easily look for a new opponent according to the user data as close to the current situation of each user.

At the end of the game, the current date is set to the Day in the opponent's user data. Accordingly, the player can determine whether the player has played the game with the user based on whether or not the Day data is shown in the ranking table, and can easily grasp past opponents with whom the player has played the game.

At the time of integrating ranking tables, if the sum of the number of pieces of user data already registered in the player's ranking table, and the number of pieces of user data registered in the received opponent's ranking table, become greater than 70, at least one piece of user data is deleted. The user can register one or more pieces of user data which cannot be erased by setting the Favorite flag. As the user intentionally designates one or more pieces of user data which will not be erased, the data of the past opponents with whom the user wants to play again can be left in the ranking table regardless of the points the past opponents have accrued. This can allow the user to look for a desired opponent to play against again based on the ranking table.

Further, at the time of integrating ranking tables, the piece of the user data whose Day is set is included in the ranking table by priority over pieces of user data whose Day is not set. The user is likely to play with whom the user has played the game in the past with another user again. This makes it easier for the user to look for a user who is a likely opponent based on the ranking table.

The process of integration of the ranking tables of users who have played with each other after playing the game includes calculation of points the game apparatus of each user has obtained, an update of the ranking tables according to the total points updated based on the calculated points, and an exchange of the ranking tables of the users. After the exchange of the ranking tables, a ranking table which reflects the current game result is created. Accordingly, the game apparatuses 1 of each of the player an opponent need only to transmit and receive just the ranking table as information, besides the information necessary to progress the game, so that no extra load will be applied to the transmission and reception of information between the game apparatuses 1 of each of the player and opponent.

In calculating the points to be added to the total points as a result of playing a game, the different points are calculated according to a difference between the grades of the player and the opponent. It is therefore possible to efficiently increase the total points according to an opponent's piece of user data so that the total points can be made to match the actual level and playing history of each user.

It is to be noted that the maximum total points is set to 500. The total points which are the accumulation of points each user obtains when winning the game are a parameter representing the skill of the user in the game. The provision of the upper limit of the total points can promote the interest of a user on making the maximum value and enhance the eagerness of the user in participating the game.

The present invention is not limited to the embodiment, and can be modified and adapted in various forms. Modifications of the embodiment adaptable to the invention will be described below.

In the embodiment, a ranking table is created according to the total points which are 500 at a maximum. Only one set of the points is included in the ranking table for each user. However, multiple sets of points may be included in the ranking table for each user. When multiple sets of points are included in a ranking table for a single user, the user will not erroneously grasp the level of another user with whom the user will play based only on a single high score obtained by luck, and can easily look for a new opponent who matches the skill level of the user himself or herself.

Although the total points do not change even if the player loses the game in the embodiment, a predetermined number of points may be subtracted from the total points when the player. In this case, the points to be subtracted from the total points of a user who loses the game need to be additionally registered as shown, for example, in FIG. 3. A modification may be made in such a way that the higher the grade to which an opponent belongs, the lower the points to be subtracted when the player loses the game. The total points may be reduced only when the user is defeated by another user with a lower grade.

If the total points are reduced as a result of having lost a game, the rank of the user may be lowered in the ranking table in some cases. In a case of a game which is not designed to increase the level of a player each time the player plays a game, it is possible to create an adequate ranking table according to the latest game situation of each user.

In the exemplary embodiment, the higher the grade of the opponent, the higher the number of points that may be obtained by a player that wins a game according to the point calculating process. The calculation of obtained points is not, however, limited to this method. For example, the points obtained (subtracted) may be changed according to the past game history with an opponent. In this case, the points obtained can be made higher as the winning average of the player with the opponent in the past games gets lower. An upper limit may be set for points obtainable from a single user within a predetermined time. In this case, when the player wins a game against a user who has more wins than the player in the past, the player can get a higher number of points so that adequate points according to the current level of the player can be calculated.

Each player may get predetermined participation points unconditionally by merely participating in a game. Points obtained (subtracted) may change according to parameters other than the total points (grade) of a player. In this case, in playing, for example, a tournament type game, points obtained (subtracted) can be made higher in the second game than in the first game. In a racing game, for example, special points may be obtained by updating the best time. Points may be calculated by using some, or all, of the above-described point calculating schemes.

Further, the ranking target is not limited to points obtained by a player as the player plays a game, or the total points obtained by the player. For example, in a racing game, the race time from the start to the goal may be determined as a score of the game result, and may be ranked.

Although pieces of user data are shown in a ranking table in a descending order of total points in the embodiment, the ranking order is not limited to this particular type and any ranking order may be selected as long as the order conforms to a predetermined rule. For example, the ranking order may be in the ascending order of total points, or may be in the ascending order or descending order of the number of games or the number of successive wins. The display mode for ascending/descending order may be changed by the user's operating the touch panel 13 or the operational switch unit 14. In this case, pieces of user data may be sorted according to a predetermined condition at the time of integrating the ranking tables. Pieces of user data may be sorted when the display mode is changed.

In the exemplary embodiment, when the received ranking table includes a piece of user data having the same Name as that of any user data already registered in the player's ranking table at the time of integrating the ranking tables, the piece of user data which is newer may be included in the integrated ranking table. However, the present invention is not limited to this. For example, the piece of user data having a higher total points may be included in the integrated ranking table. When the total points are reduced according to the game result, or when points according to the result of each game are to be ranked, a ranking table can be created by collecting the maximum points of individual users, thus increasing the competitive sense of users for the game.

While all the pieces of user data registered in the ranking table received from an opponent may be processed at the time of integrating the ranking tables in the exemplary embodiment, the processing is not limited to this particular type, but may include processing only pieces of user data designated by a player to be processed. The piece of user data designated by a player may be processed by priority. The player may designate the pieces of user date of other users who are in the same grade as the player in this case.

When the sum of the number of pieces of user data in the ranking table originally stored in the game apparatus 1 and the number of pieces of user data in the ranking table received from the opponent's game apparatus 1 exceeds "70", those pieces of user data which have higher total points will be included in a new ranking table by priority, in the embodiment. However, those pieces of user data whose total points are close to the total points of the player, or whose grades are the same as that of the player, may be included in a new ranking table by priority.

Leaving pieces of the user data of other users, having total points close to the total points of the player in a ranking table by priority, can make it easier for the user of each game apparatus 1 to search for another user as a potential opponent who matches the player in ability.

When the sum of the number of pieces of user data in the ranking table originally stored in the game apparatus 1, and the number of pieces of user data in the ranking table received from the opponent's game apparatus 1 exceeds "70", those pieces of user data having the higher total points will be included in a new ranking table by priority, in the embodiment. However, the pieces of user data which are in the ranking table originally stored in the game apparatus 1 may be included in a new ranking table by priority. This is because the pieces of user data included in the ranking table originally stored in the game apparatus 1 can be user data of another user who has a deeper relationship with the player, so that the user data of a user who is likely to be an opponent can be left in the ranking table.

Although the Name, Rank, Total Points, Day and Favorite flag are associated with one another in each piece of user data in the embodiment, each piece of user data may include other kinds of data. For example, information indicating the attribute of a user, such as a group may be included. Alternatively, game information, such as the number of games played or the number of successive wins may be included. In this case, when the sum of the number of pieces of user data in the ranking table originally stored in the game apparatus 1 and the number of pieces of user data in the received ranking table exceeds "70", pieces of user data to be left in a new ranking table can be selected by priority according to the information, such as, for example, the attribute.

In the embodiment, after each game apparatus 1 creates a ranking table reflecting the total points calculated after playing the game, the ranking tables are exchanged between the game apparatuses 1 to create a new ranking table in each game apparatus 1. When points, which are calculated according to the result of a game, are to be ranked, for example, each game apparatus 1 can calculate the points of the player and the points of the opponent according to the current game result, and exchange a ranking table which does not reflect the current game result with the other game apparatus 1. The transmission and reception of ranking tables between the game apparatuses 1 can be carried out while, or before, the game is progressing.

Each game apparatus 1 can integrate the points of the player and the points of the opponent calculated according to the current game result, the ranking table, which has been stored since before the initiation of the game, and the ranking table, which does not reflect the current game result and is received from the opponent's game apparatus 1, to create a new ranking table. In this case, it is possible to shorten the time in which the game apparatuses 1 need to be placed in a peer-to-peer communicatable environment after the game is finished.

In the case where the ranking tables reflecting the game result are exchanged between the game apparatuses 1 to integrate the ranking tables, as well as in the case where the ranking tables before reflecting the game result are exchanged between the game apparatuses 1 to integrate the ranking tables, the integration scheme is not limited to the one mentioned in the foregoing description of the embodiment, as the skilled artisan will recognize. For example, two ranking tables may be integrated using a scheme adapted to a merge-sort.

In the above-described embodiment, multiple game apparatuses 1 which play a game with one another are placed in a peer-to-peer communicatable environment beforehand. The game apparatus 1 does not function as a computer apparatus in order that the user may look for another user to be an opponent. However, the game apparatus 1 of a user who wants to play a game with somebody else may detect other game apparatuses 1 within a peer-to-peer communicatable area by exchanging a predetermined signal with the other game apparatuses 1. Another user, having user data included in a ranking table, may be extracted from the users of the detected other game apparatuses 1, and may be displayed on the display screen as a potential opponent.

Accordingly, the user who wants to play the game with somebody else can easily look for another user who is in a competable state. When multiple pieces of user data of the users of other game apparatuses 1, located within a peer-to-peer communicatable area, are registered in the ranking table registered in the WRAM 22, another user, who qualifies as the most likely opponent, can be selected according to information, such as, for example, whether or not the Day and/or favorite flag is set, etc., and presented as an opponent candidate.

Although a competitive type game in which two players participate is explained in the foregoing description of the embodiment, the invention can also be adapted to a competitive type game in which three or more players participate. Game apparatuses of players who participate in the game are connected to one another to transmit and receive information on the game in progress and ranking information. When the invention is adapted to a competitive type game in which three players participate, for example, after playing the game, each game apparatus integrates a total of three ranking tables, namely the ranking table stored in the game apparatus and two ranking tables received from the other two game apparatuses.

Although the foregoing description of the embodiment explains that multiple game apparatuses 1, which play a game wirelessly, communicate with one another in a peer-to-peer manner, the game apparatuses 1 may communicate with one another in a peer-to-peer manner through cable communications. Multiple game apparatuses which play a game may be connected to one another via a LAN (Local Area Network), and carry out peer-to-peer communications with one another. Further, multiple game apparatuses which play a game may be connected to one another via a server apparatus. In this case, the server apparatus may only intervene transmission and reception of information between game apparatuses and may not, for example, tally ranking.

In the foregoing description of the embodiment, the game apparatus 1, which has two display devices, the first LCD 11 and the second LCD 12, and the touch panel 13 as the pointing device, executes a basketball game to which the invention is adapted. However, a computer apparatus other than the game apparatus, which has at least one display device which displays the images of a game, an input device which allows a player to input instructions, and a communication device capable of transmitting and receiving information to and from another game apparatus 1 may execute a game to which the invention is adapted. The computer apparatus that executes the game to which the invention is adapted may be a game-specific machine or a general-purpose machine, such as, for example, a personal computer, and may be a portable type or a desk-top type. A cellular phone may be adapted as the computer apparatus that executes the game to which the invention is adapted.

In the embodiment, the game program and data for the game apparatus 1 are stored in the ROM 171 of the cartridge 17 (such as, for example, shown in FIG. 2) and are distributed in this form. However, a recording medium storing the game program and data is not limited to this type, and may be, for example, an optical and/or magnetic disk device (flexible disk, CD-ROM, DVD-ROM, or the like) in accordance with the computer apparatus serving as the platform. In a case where the platform is a computer apparatus having a fixed disk device, the game program and data may be stored on the fixed disk device beforehand.

In a case where a computer apparatus having Internet connecting capability serves as a platform, the game program and data may be stored on a fixed disk device of a server apparatus present on the Internet, and may be distributed by superimposing data signals of the game program and data stored on the fixed disk device on a carrier wave and transmitting the resultant carrier wave to the computer apparatus serving as the platform.

What is claimed is:

1. A game apparatus, which is connectable to an other game apparatus in a peer to peer manner, for executing a competitive game with the other game apparatus having functions of executing the competitive game and generating a ranking of scores obtained in the competitive game, by causing a communicator to transmit information to, and to receive information from, the other game apparatus, the game apparatus comprising:
    a game executor that executes a current game of the competitive game with the other game apparatus while causing the communicator to transmit and receive information on the current game to and from the other game apparatus;
    a local score determiner that determines a current score obtained by a user of the game apparatus based on a result of the current game executed by the game executor;
    a ranking storage that stores user ranking information that ranks at least one previous score previously determined by the local score determiner in a past game of the competitive game and other scores obtained by other users in other past games of the competitive game;
    a ranking information obtainer that obtains opponent ranking information of an opponent user of the other game apparatus by causing the communicator to receive the opponent ranking information stored in the other game apparatus of the opponent user;
    a ranking integrator that integrates the current score determined by the local score determiner, the user ranking information stored in the ranking storage prior to the current game being executed by the game executor, and the opponent ranking information obtained by the ranking information obtainer, to generate new ranking information and to store the new ranking information in the ranking storage; and
    a ranking output that outputs the new ranking information integrated by the ranking integrator and stored in the ranking storage,
    wherein the ranking storage stores ranking information for a predetermined number of scores,
    the new ranking information, integrated by the ranking integrator, includes the predetermined number of scores, and
    when a number of scores to be integrated by the ranking integrator is greater than the predetermined number of scores, the ranking integrator includes a stored history ranking user selector that selects, from among scores included in the opponent ranking information, a score of a user that is included in the user ranking information that was stored in the ranking storage prior to the current game being executed by the game executor to be included in the new ranking information in priority to other scores included in the opponent ranking information.

2. The game apparatus according to claim 1, wherein the user ranking information includes competition information indicating whether each score included in the user ranking information is a score of a user with whom the user of the game apparatus has previously played the competitive game, and
    the ranking integrator includes a competition history ranking user selector that selects, from among scores included in the user ranking information, a score including the competition information that indicates the score of the user with whom the user of the game apparatus has previously played to be included in the new ranking information in priority to other scores included in the user ranking information.

3. The game apparatus according to claim 1, wherein the new ranking information includes a predetermined specific number of scores obtained by a same user.

4. The game apparatus according to claim 1, wherein the ranking integrator includes a sorter for sorting scores in one of an ascending order and a descending order when generating the new ranking information.

5. The game apparatus according to claim 1, wherein, the ranking integrator includes a conditional score selector that selects one of the scores of the same user which fulfills a predetermined condition to be included in the new ranking information from among the scores of the same user when the user ranking information and the opponent ranking information include scores of a same user.

6. The game apparatus according to claim 5, wherein the ranking information includes time information indicating a time at which a ranked score is determined, and
    the conditional score selector selects the one of the scores of the same user which indicates a newer time information to be included in the new ranking information.

7. The game apparatus according to claim 5, wherein the conditional score selector selects a favorable score as the one of the scores of the same user to be included in the new ranking information.

8. The game apparatus according to claim 1, wherein the ranking integrator includes a relative ranking user selector that selects a score to be included in the new ranking information according to the at least one previous score obtained by the user.

9. The game apparatus according to claim 1, wherein the user ranking information and the opponent ranking information include attribute information indicating an attribute of each user whose score is ranked, and
    the ranking integrator includes an attribute ranking user selector that selects a score to be included in the new ranking information according to the attribute information of a user corresponding to each score to be integrated.

10. The game apparatus according to claim 1, wherein the ranking information includes time information indicating a time at which a ranked score is obtained, and the ranking integrator includes a time ranking user selector that selects a user whose score is to be included in the new ranking information according to the time information corresponding to each score to be integrated.

11. The game apparatus according to claim 1, further comprising a ranking information updater that updates the ranking information stored in the ranking information storage based on the current score determined by the local score determiner, after the local score determiner determines the current score obtained by the user of the game apparatus and before the ranking information obtainer obtains the opponent ranking information of the opponent user, and wherein the ranking information obtainer obtains the opponent ranking information of the opponent user by receiving the opponent ranking information updated by the ranking information updater in the other game apparatus.

12. The game apparatus according to claim 1, further comprising an opponent score determiner that determines an opponent score obtained by the opponent user of the other game apparatus, based on a result of the current game executed by the game executer, and wherein the ranking information obtainer obtains the opponent ranking information prior to the opponent score, which is determined by the local score determiner in the other game apparatus, being reflected, and the ranking integrator integrates the current score determined by the local score determiner, the opponent score determined by the opponent score determiner, the user ranking information stored in the ranking storage prior to the game being executed by the game executer, and the opponent ranking information obtained by the ranking information obtainer, to generate the new ranking information and store the new ranking information in the ranking storage.

13. The game apparatus according to claim 1, wherein the local score determiner determines the current score obtained by the user of the game apparatus according to one of an opponent score obtained by the user of the other game apparatus and a ranking of the opponent score.

14. The game apparatus according to claim 1, wherein the local score determiner determines the current score obtained by the user of the game apparatus according to a past game result with the user of the other game apparatus, who was the opponent of the current game.

15. The game apparatus according to claim 1, further comprising:
a communicatable apparatus detector that detects other game apparatuses which are in a communicatable state so as to be able to transmit information to, and to receive information from, the game apparatus by the communicator;
an opponent candidate extractor that extracts a user included in the user ranking information as an opponent candidate from among users of the other game apparatuses detected to be in a communicatable state; and
an opponent candidate outputter that outputs information on the user extracted as the opponent candidate by the opponent candidate extractor.

16. A game apparatus, which is connectable to an other game apparatus in a peer-to-peer manner, for executing a competitive game with the other game apparatus having functions of executing the competitive game and generating a ranking of scores obtained in the competitive game, by causing a communicator to transmit information to, and to receive information from the other game apparatus, the game apparatus comprising:

a game executor that executes a current game of the competitive game with the other game apparatus while causing the communicator to transmit and receive information on the current game to and from the other game apparatus;
a local score determiner that determines a current score obtained by a user of the game apparatus based on a result of the current game executed by the game executor;
a ranking storage that stores user ranking information that ranks at least one previous score previously determined by the local score determiner in a past game of the competitive game and other scores obtained by other users in other past games of the competitive game;
a ranking information obtainer that obtains opponent ranking information of the opponent user of the other game apparatus by causing the communicator to receive the opponent ranking information stored in the other game apparatus of the opponent user;
a ranking integrator that integrates the current score determined by the local score determiner, the user ranking information stored in the ranking storage prior to the current game being executed by the game executor, and the opponent ranking information obtained by the ranking information obtainer, to generate new ranking information and to store the new ranking information in the ranking storage; and
a ranking output that outputs the new ranking information integrated by the ranking integrator and stored in the ranking storage,
wherein the ranking storage stores ranking information ranking for a predetermined number of scores,
the user ranking information includes competition information indicating whether each score included in the user ranking information is a score of a user with whom the user of the game apparatus has previously played the competitive game, and
the new ranking information, integrated by the ranking integrator, includes the predetermined number of scores, and
when a number of scores to be integrated by the ranking integrator is greater than the predetermined number of scores, the ranking integrator includes a competition history ranking user selector that selects, from among scores included in the user ranking information, a score including the competition information that indicates the score of the user with whom the user of the game apparatus has previously played to be included in the new ranking information in priority to other scores included in the user ranking information.

17. A ranking information creating method to be executed by a computer apparatus, which is connectable to an other game apparatus in a peer-to-peer manner, for executing a competitive game with the other game apparatus having functions of executing the competitive game and generating a ranking of scores obtained in the competitive game, by causing a communicator to transmit information to, and to receive information from, the other game apparatus, and for creating ranking information of a current score which was obtained as a current game result, the method comprising:

executing, by a processor in the computer apparatus, a current game of the competitive game with the other computer apparatus while causing the communicator to transmit information to, and to receive information from, the other computer apparatus on the current game;

determining a current score obtained by a user of the computer apparatus based on the current game result of the current game to be stored temporarily in a storage in the computer apparatus;

obtaining opponent ranking information of an opponent user of the current game to be stored temporarily in the storage by causing the communicator to receive the opponent ranking information stored in the storage of the opponent user;

integrating the current score obtained by the user of the computer apparatus as the current game result, user ranking information stored in the storage in the computer apparatus prior to execution of the current game, and the opponent ranking information obtained from the other computer apparatus, generating new ranking information, and storing the new ranking information in the storage; and outputting the new ranking information from an outputter of the computer apparatus, wherein the storage stores ranking information ranking for a predetermined number of scores, the new ranking information includes the predetermined number of scores, when a number of scores to be integrated is greater than the predetermined number of scores, the integrating selects, from among scores included in the opponent ranking information, a score of a user that is included in the user ranking information that was stored in the storage prior to the current game being executed to be included in the new ranking information in priority to other scores included in the opponent ranking information.

18. The ranking information creating method according to claim 17, further comprising:

detecting other game apparatuses which are in a communicatable state so as to be able to transmit information to, and to receive information from, the game apparatus by the communicator;

extracting a user included in the user ranking information from among users of the other game apparatuses detected to be in the communicatable state as an opponent candidate; and outputting information on the user extracted as the opponent candidate from the outputter.

19. A ranking information creating method to be executed by a computer apparatus, which is connectable to an other game apparatus in a peer to peer manner, for executing a competitive game with the other game apparatus having functions of executing the competitive game and generating a ranking of scores obtained in the competitive game, by causing a communicator to transmit information to, and to receive information from, the other game apparatus, and for creating ranking information of a current score which was obtained as a current game result, the method comprising:

executing, by a processor in the computer apparatus, a current game of the competitive game with the other computer apparatus while causing the communicator to transmit information to, and to receive information from, the other computer apparatus on the current game;

determining a current score obtained by a user of the computer apparatus based on the current game result of the current game to be stored temporarily in a storage in the computer apparatus;

obtaining opponent ranking information of the opponent user of the current game to be stored temporarily in the storage by causing the communicator to receive the opponent ranking information stored in the storage of the opponent user;

integrating the current score obtained by the user of the computer apparatus as the current game result, user ranking information stored in the storage in the computer apparatus prior to execution of the current game, and the opponent ranking information obtained from the other computer apparatus, generating new ranking information, and storing the new ranking information in the storage; and outputting the new ranking information from an outputter of the computer apparatus, wherein the storage stores ranking information ranking for a predetermined number of scores, the user ranking information includes competition information indicating whether each score included in the user ranking information is a score of a user with whom the user of the game apparatus has previously played the competitive game, and the new ranking information includes the predetermined number of scores, and when a number of scores to be integrated is greater than the predetermined number of scores, the integrating selects, from among scores included in the user ranking information, the score including the competition information that indicates the score of the user with whom the user of the game apparatus has previously played to be included in the new ranking information in priority to other scores included in the user ranking information.

20. A computer readable medium that stores a program for use by a computer apparatus, which is connectable to an other game apparatus in a peer-to-peer manner, for executing a competitive game with the other game apparatus having functions of executing the competitive game and generating a ranking of scores obtained in the competitive game, by causing a communicator to transmit information to, and to receive information from, the other game apparatus, the computer readable medium causing the computer apparatus to:

execute, by a game executer, a current game of the competitive game with the other computer apparatus while causing the communicator to transmit and receive information on the current game to and from the other computer apparatus;

determine a current score obtained by a user of the computer apparatus based on a current result of the current game executed by the game executer;

obtain opponent ranking information of an opponent user of the current game executed by the game executer by causing the communicator to receive the opponent ranking information stored in a storage of the opponent user;

integrate the current score, user ranking information stored in the storage in the computer apparatus prior to the current game being executed by the game executer, and the opponent ranking information, to generate new ranking information and store the new ranking information in the storage; and output the new ranking information which has been integrated and stored in the storage, wherein the storage stores ranking information that ranks a predetermined number of scores, the new ranking information includes the predetermined number of scores, and when a number of scores to be integrated is greater than the predetermined number of scores, a score of a user that is included in the user ranking information which has been stored in the storage prior to the current game being executed is selected, from among scores included in the opponent ranking information, as a score to be included in the new ranking information in priority to other scores included in the opponent ranking information.

21. The computer readable medium according to claim 20, which causes the computer apparatus to:

detect other game apparatuses which are in a communicatable state so as to be able to transmit information to, and to receive information from the game apparatus by the communicator;

extract a user included in the user ranking information as an opponent candidate from among users of the other game apparatuses detected to be in a commensurable state, and output information on the user extracted as the opponent candidate.

22. A computer readable program for use by a computer apparatus, which is connectable to an other game apparatus in a peer-to-peer manner, for executing a competitive game with the other game apparatus having functions of executing the competitive game and generating a ranking of scores obtained in the competitive game, by causing a communicator to transmit information to, and to receive information from, the other game apparatus, the computer readable medium causing the computer apparatus to:

execute, by a game executer, a current game of the competitive game with the other computer apparatus while causing the communicator to transmit and receive information on the current game to and from the other computer apparatus;

determine a current score obtained by a user of the computer apparatus based on a current result of the current game executed by the game executer;

obtain opponent ranking information of an opponent user of the current game executed by the game executer by causing the communicator to receive the opponent ranking information stored in a storage of the opponent user;

integrate the current score, user ranking information stored in the storage in the computer apparatus prior to the current game being executed by the game executer, and the opponent ranking information, to generate new ranking information and store the new ranking information in the storage; and output the new ranking information which has been integrated and stored in the storage, wherein the storage stores ranking information that ranks a predetermined number of scores, the new ranking information includes the predetermined number of scores, and when a number of scores to be integrated is greater than the predetermined number of scores, a score which is included in the user ranking information which has been stored in the storage prior to the current game being executed by the game executer and which indicates a score of a user with whom the user of the game apparatus has previously played the competitive game is selected, from among the scores included in the user ranking information, as a score to be included in the new ranking information in priority to other scores included in the user ranking information.

* * * * *